(12) United States Patent
Kim et al.

(10) Patent No.: US 10,132,332 B2
(45) Date of Patent: Nov. 20, 2018

(54) BLOWER UNIT OF AIR CONDITIONER FOR VEHICLE

(71) Applicant: HANON SYSTEMS, Daejeon (KR)

(72) Inventors: Young In Kim, Daejeon (KR); Yong Sik Kim, Daejeon (KR); Young Kee Baek, Daejeon (KR); Jun Min Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 388 days.

(21) Appl. No.: 15/070,018

(22) Filed: Mar. 15, 2016

(65) Prior Publication Data

US 2016/0273554 A1 Sep. 22, 2016

(30) Foreign Application Priority Data

Mar. 16, 2015 (KR) .......................... 10-2015-0036083
Mar. 8, 2016 (KR) .......................... 10-2016-0027511

(51) Int. Cl.
*F04D 29/70* (2006.01)
*F04D 17/10* (2006.01)
*B60H 1/00* (2006.01)

(52) U.S. Cl.
CPC ....... *F04D 29/701* (2013.01); *B60H 1/00521* (2013.01); *F04D 17/10* (2013.01); *B60H 2001/00085* (2013.01)

(58) Field of Classification Search
CPC ...... B60H 2001/00085; B60H 1/00521; F04D 17/10; F04D 29/701; B01D 46/52
USPC ..................................................... 415/121.2
See application file for complete search history.

(56) References Cited

U.S. PATENT DOCUMENTS

| | | | |
|---|---|---|---|
| 4,560,395 A * | 12/1985 | Davis | F24F 3/1603 96/381 |
| 6,206,633 B1* | 3/2001 | Nakamura | B60H 1/00457 264/328.1 |
| 7,748,381 B2* | 7/2010 | Croll | F04D 29/4246 128/204.18 |
| 8,167,550 B2* | 5/2012 | Nakamura | F04D 29/703 415/203 |
| 8,939,823 B2* | 1/2015 | Kanemaru | B60H 1/00471 454/139 |
| 9,925,844 B2* | 3/2018 | Kehimkar | B60H 1/00028 |
| 9,956,846 B2* | 5/2018 | Bailey | B60H 1/00849 |

FOREIGN PATENT DOCUMENTS

| | | | |
|---|---|---|---|
| CN | 101054056 A | 10/2007 | |
| DE | 19902329 B4 | 1/2006 | |
| KR | 20140001342 A * | 1/2014 | .............. B01H 1/12 |

* cited by examiner

*Primary Examiner* — Timothy L Maust
(74) *Attorney, Agent, or Firm* — Dickinson Wright PLLC

(57) ABSTRACT

Disclosed is a blower unit of an air conditioner for a vehicle which is freely changed in design of an intake unit of a blower case, increases dust collection efficiency of an air filter, and improves continuity of filtration-to-area efficiency so as to increase an exchange cycle of the air filter. The blower unit includes a blower case having an inside air inlet for introducing inside air and an outside air inlet for introducing outside air, a blower wheel disposed inside the blower case and rotated by a blower motor, and an air filter disposed at the upstream side of the blower wheel in an air flow direction to filter impurities. The air filter includes: a main filter part corresponding to an air intake area; and auxiliary filter parts which are formed in the outside direction of the air intake area.

15 Claims, 9 Drawing Sheets

Prior Art

Prior Art

Prior Art

BLOWER UNIT OF AIR CONDITIONER FOR VEHICLE

CROSS-REFERENCE TO RELATED APPLICATIONS

This application claims the benefit and priority of KR 10-2015-0036083 filed Mar. 16, 2015 and KR 10-2016-0027511 filed Mar. 8, 2016. The entire disclosures of each of the above applications are incorporated herein by reference.

BACKGROUND OF THE INVENTION

Field of the Invention

The present invention relates to a blower unit of an air conditioner for a vehicle, and more particularly, to a blower unit of an air conditioner for a vehicle which can selectively blow inside air or outside air by force to the inside of an air-conditioning case of the vehicle.

Background Art

An air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes: a blower unit for sending inside air or outside air to the inside of an air-conditioning case; an evaporator disposed inside the air-conditioning case in order to cool the inside of the air-conditioning case; and a heater core for heating the inside of the air-conditioning case, and selectively send the air cooled by the evaporator or heated by the heater core toward parts of the interior of the vehicle.

FIG. 1 is a sectional view showing the inside of a conventional air conditioner for a vehicle. As shown in FIG. 1, the conventional air conditioner 1 for a vehicle includes a blower unit 10 and an air-conditioning unit 40. The blower unit 10 includes a blower case 19, an intake door 15 and a blower 16. The blower case 19 has inside and outside air inlets 11 and 12 formed at an upper side thereof, and the intake door 15 is mounted to selectively open and close the inside and outside air inlets 11 and 12. The blower 16 sends the inside air and the outside air introduced through the inside and outside air inlets 11 and 12 toward an air-conditioning case 49 by force.

The inside air inlet 11 and the outside air inlet 12 are respectively formed at both sides of the upper side of the blower unit 10, and the blower unit 10 includes an intake unit having the intake door 15 which selectively opens and closes the inside and outside air inlets 11 and 12 while rotating the inside air inlet 11 and the outside air inlet 12. The blower unit 10 includes: a blower motor 17 which is mounted inside the blower case 19 to blow axial air introduced from the inside air inlet 11 or the outside air inlet 12 in a radial direction; and a blower wheel which is joined to a rotary shaft of the blower motor 17. Moreover, the blower unit 10 further includes an air filter 18 which is mounted at the upstream side of the blower motor 17 in an air flow direction in order to purify the introduced air.

The air-conditioning unit 40 includes an air-conditioning case 49, an evaporator 41 and a heater core 42. The air-conditioning case 49 has an air inflow port 43 which is formed at an entrance to induce the air blown from the blower unit 10 and a plurality of air outflow ports 44 which are formed at an exit to be opened and closed by mode doors 46. The evaporator 41 and the heater core 42 are mounted to be spaced apart from each other at a predetermined interval in order. A temperature-adjusting door 45 is mounted between the evaporator 41 and the heater core 42 to control temperature by adjusting an amount of mixture that cold air passing the evaporator 41 and warm air passing the heater core 42 are mixed together.

Through the above structure, inside air or outside air of the vehicle is selectively introduced by the blower wheel according to opening and closing of the intake door 15. The introduced air is cooled or heated when it selectively passes the evaporator 41 along the air-conditioning case 49 or the heater core 42 by operation of the temperature-adjusting door 45. After that, the cooled or heated air is branched to branch ducts according to opening and closing of a plurality of the mode doors 46 by an air-conditioning mode so as to be discharged to each part of the interior of the vehicle, so that the interior of the vehicle is cooled, heated or ventilated.

FIG. 2 is a perspective view showing a conventional air filter. Referring to FIG. 2, the conventional air filter 18 includes a frame 181 made with a rigid material, such as plastic, and a filtering material 182. The air filter 18 is in a form of a rectangular plate with a predetermined thickness, and the filtering material 182 is folded to have a plurality of creases. Such an air filter 18 is produced and used to correspond to a vehicle package, and the exchange cycle of the air filter is generally six months to one year.

However, the conventional air filter is used for common use regardless of kinds and sizes of vehicles. Thus, as shown in FIG. 3, it is difficult to freely change the design of the intake unit of the blower case 19 of the vehicle because it is restricted by the form of the air filter 18.

Furthermore, a circular blower inlet 191 is formed in the blower case 19 above the blower 16, and the air passing the air filter 18 passes through the blower inlet 191 and moves forward the blower 16. In this instance, the air filter 18 is located above the blower inlet 191 and is mounted on the blower case 19 with the center of the blower inlet 19 as the center of gravity. As described above, because the air filter 18 is in the form of the rectangular plate, the air filter 18 has a limitation in the area which is covered by the air filter 18, and hence, has a limitation in increasing dust collection efficiency.

SUMMARY OF THE INVENTION

Accordingly, the present invention has been made in view of the above-mentioned problems occurring in the prior art, and it is an object of the present invention to provide a blower unit of an air conditioner for a vehicle which is freely changed in design of an intake unit of a blower case, increases dust collection efficiency of an air filter, and improves continuity of filtration-to-area efficiency so as to increase an exchange cycle of the air filter.

To accomplish the above object, according to the present invention, there is provided a blower unit of an air conditioner for a vehicle including: a blower case having an inside air inlet for introducing inside air and an outside air inlet for introducing outside air; a blower wheel disposed inside the blower case and rotated by a blower motor; and an air filter disposed at the upstream side of the blower wheel in an air flow direction to filter impurities, wherein the air filter includes: a main filter part corresponding to an air intake area; and auxiliary filter parts which are formed in the outside direction of the air intake area.

The blower unit of the air conditioner for a vehicle according to the present invention can maintain filtration performance of the air filter for a long period and increase the exchange cycle of the air filter because air passes an auxiliary filter part formed in the axial direction of the main filter part and is introduced into a blower inlet.

Moreover, the blower unit of the air conditioner for a vehicle according to the present invention can freely change the design of the intake unit regardless of kinds and sizes of vehicles and increase the size of the air filter so as to enhance filtration performance, and prevent an error in assembly of the filter because the air filter is a polygonal filter.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiments of the present invention with reference to the attached drawings.

Figure 1:
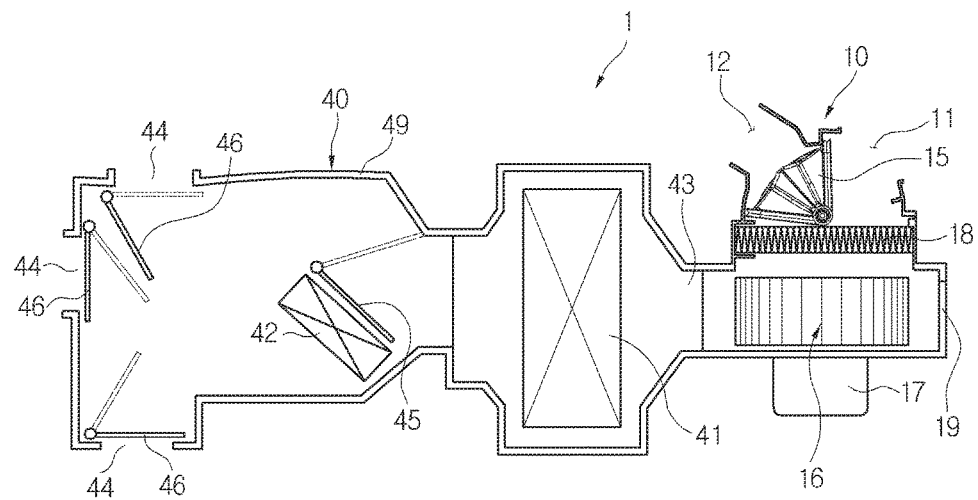
FIG. 1 is a sectional view showing the inside of a conventional air conditioner for a vehicle.
Figure 2:
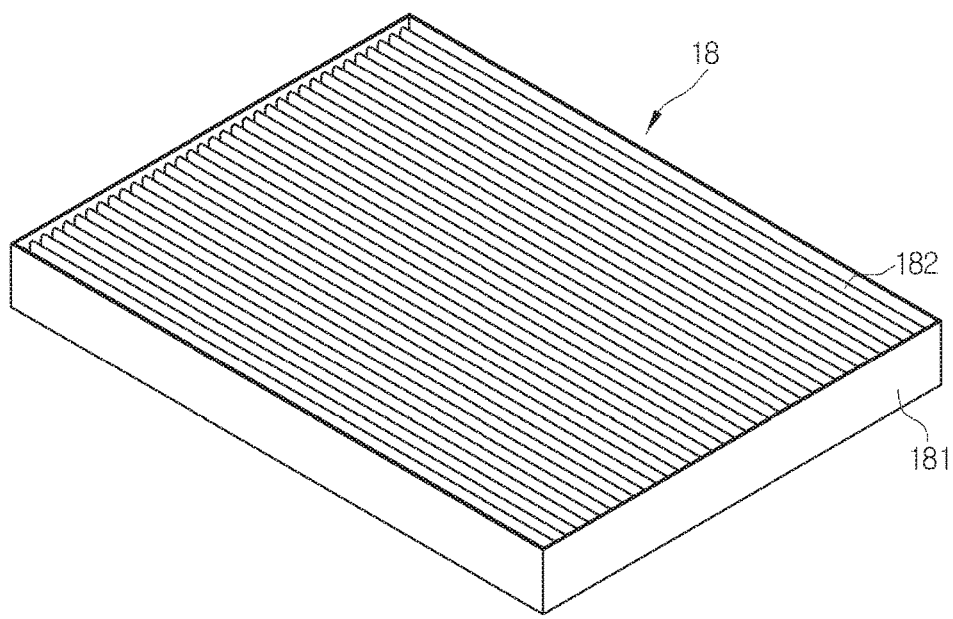
FIG. 2 is a perspective view showing a conventional air filter.
Figure 3:
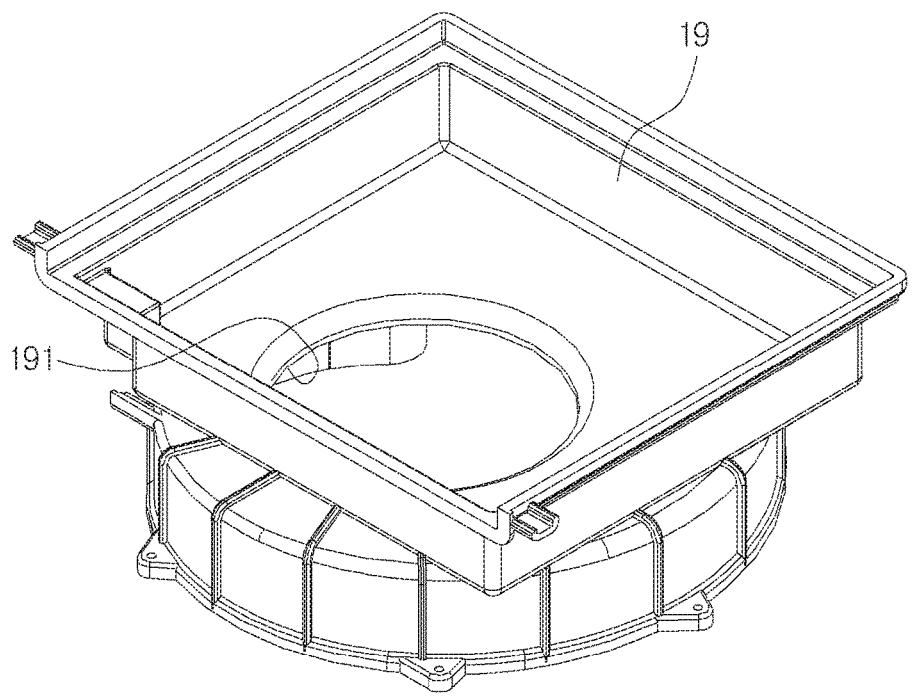
FIG. 3 is a perspective view showing the inside of a blower unit of the conventional air conditioner for a vehicle.
Figure 4:
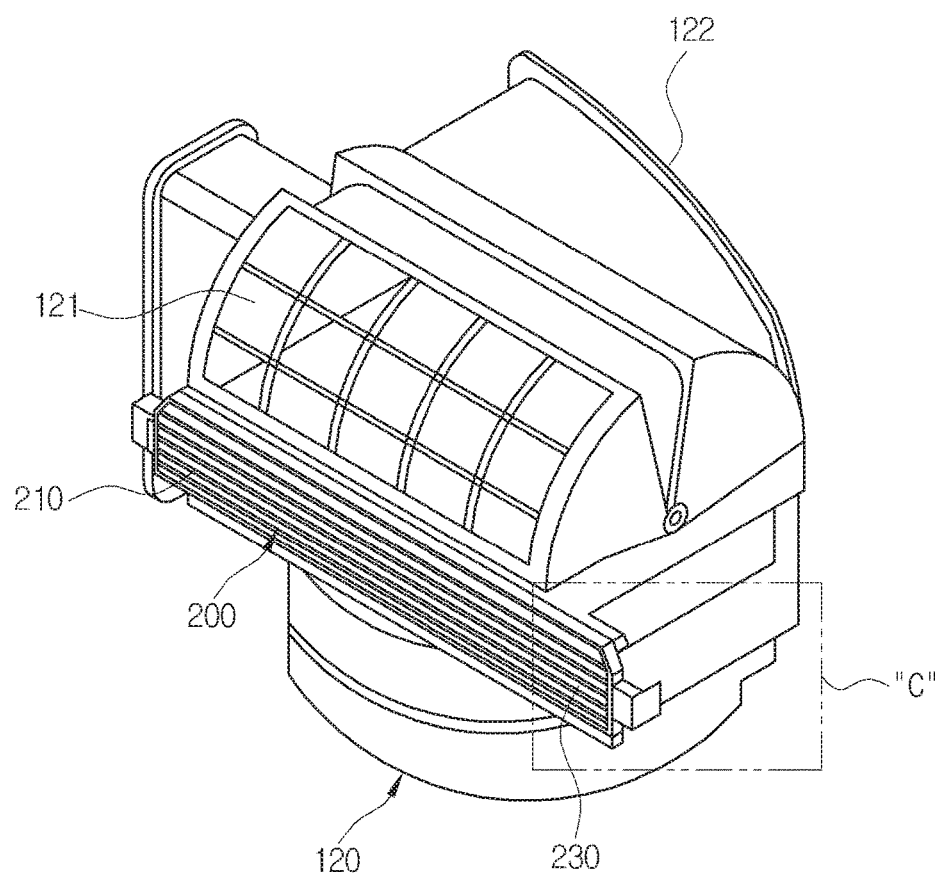
FIG. 4 is a perspective view showing a blower unit of an air conditioner for a vehicle according to a preferred embodiment of the present invention.
Figure 5:
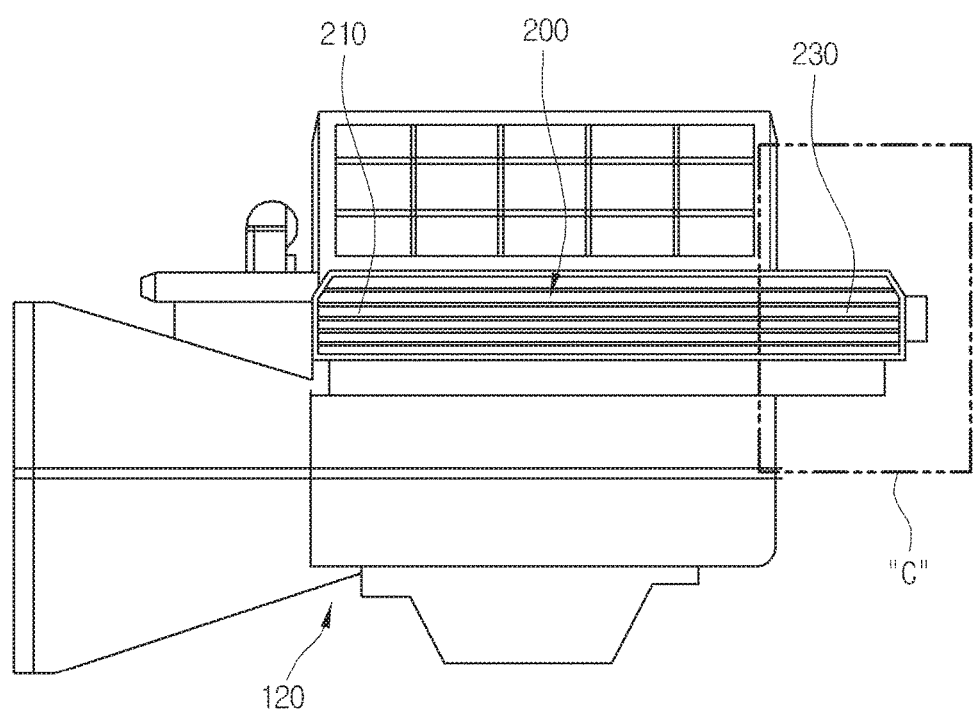
FIG. 5 is a front view showing the blower unit of the air conditioner for the vehicle according to the preferred embodiment of the present invention.
Figure 6:
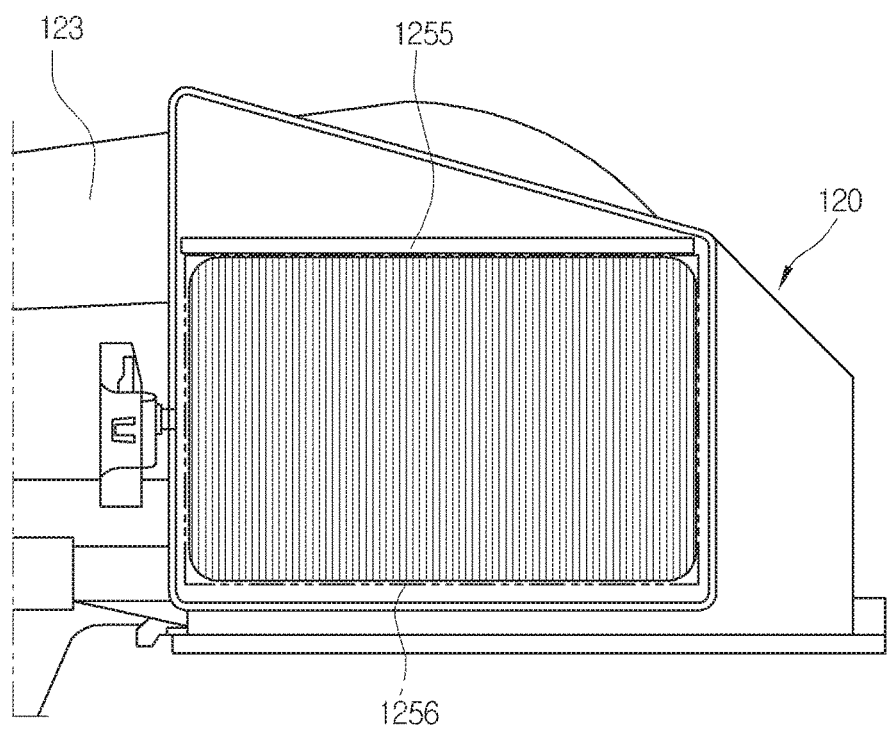
FIG. 6 is a plan view from the top, in partial section, showing the blower unit of the air conditioner for the vehicle according to the preferred embodiment of the present invention.
Figure 7:
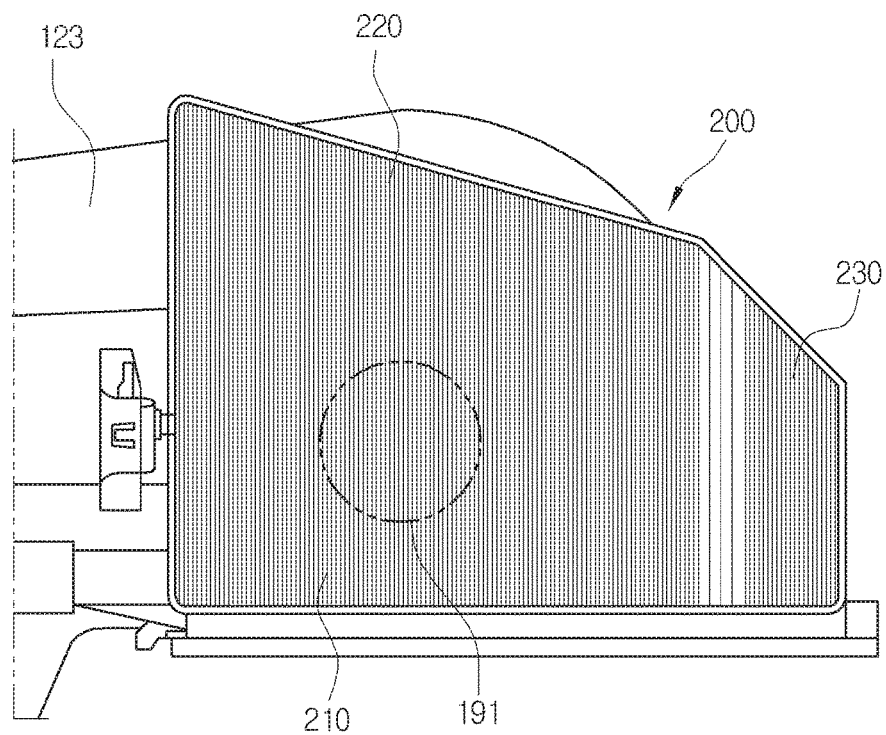
FIG. 7 is a sectional view showing the inside of the blower unit of the air conditioner for the vehicle according to the preferred embodiment of the present invention.
Figure 8:
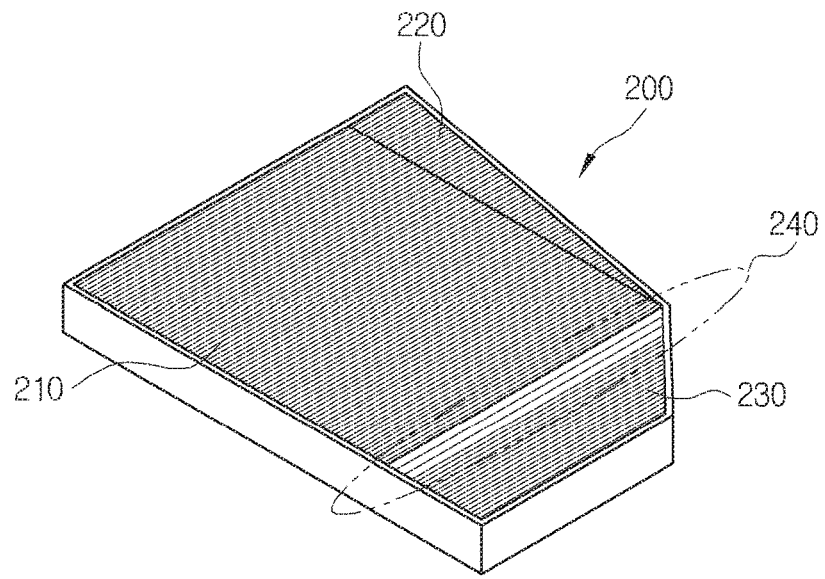
FIG. 8 is a perspective view showing an air filter of the air conditioner for the vehicle according to the preferred embodiment of the present invention.
Figure 9:
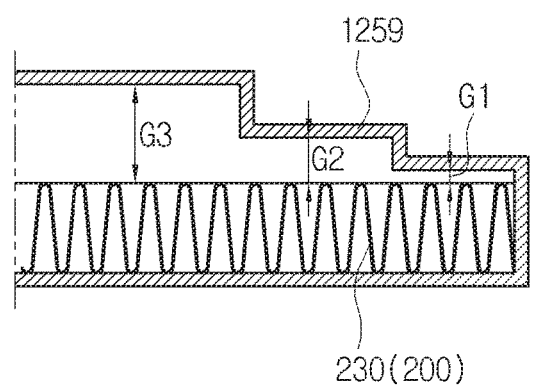
FIG. 9 is a side sectional view showing the air filter of the air conditioner for the vehicle according to the preferred embodiment of the present invention.
Figure 10:
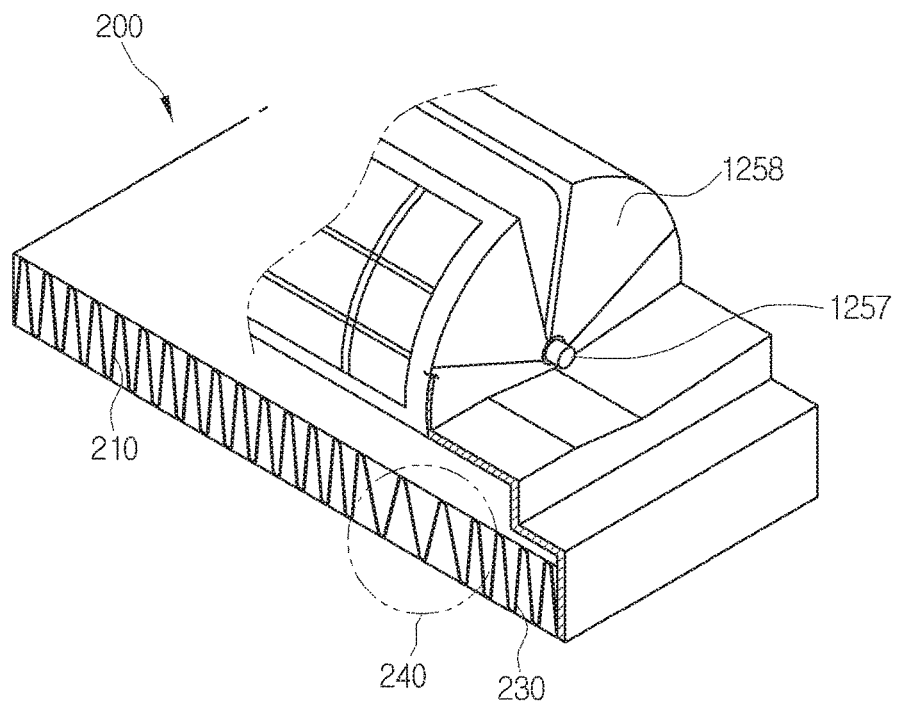
FIG. 10 is a perspective view, in partial section, of the blower unit of the air conditioner for the vehicle according to the preferred embodiment of the present invention.

FIG. 4 is a perspective view showing a blower unit of an air conditioner for a vehicle according to a preferred embodiment of the present invention, FIG. 5 is a front view showing the blower unit of the air conditioner for the vehicle, FIG. 6 is a plan view from the top, in partial section, showing the blower unit of the air conditioner for the vehicle, FIG. 7 is a sectional view showing the inside of the blower unit of the air conditioner for the vehicle, FIG. 8 is a perspective view showing an air filter of the air conditioner for the vehicle, FIG. 9 is a side sectional view showing the air filter of the air conditioner for the vehicle, and FIG. 10 is a perspective view, in partial section, of the blower unit of the air conditioner for the vehicle.

As shown in FIGS. 4 to 10, the air conditioner for the vehicle according to the preferred embodiment of the present invention includes a blower unit 120 and an air-conditioning unit. The blower unit 120 is communicatingly joined to one side of an air-conditioning case, which will be described later, in order to blow air to the inside of the air-conditioning case, and includes a blower case 123, an intake door, a blower motor, a blower wheel and an air filter 200.

The blower case 123 has an inside air inlet 121 for introducing the inside air and an outside air inlet 122 for introducing the outside air, and the inside air inlet 121 and the outside air inlet 122 are formed at the upper side of the blower case 123. The intake door is mounted to selectively open and close the inside air inlet 121 and the outside air inlet 122. The blower motor and the blower wheel send the inside air and the outside air introduced through the inside air inlet 121 and the outside air inlet 122 toward the air-conditioning case by force. The air filter 200 is mounted at the upstream side of the blower motor in an air flow direction in order to filter impurities of the introduced air.

The air-conditioning unit includes the air-conditioning case, an evaporator and a heater core. The air-conditioning case has an air inflow port which is formed at an entrance to introduce air blown from the blower unit and a plurality of air outflow ports which are formed at an exit and are opened and closed by a plurality of mode doors. The evaporator and the heater core are mounted inside the air-conditioning case to be spaced apart from each other at a predetermined interval in order. A temperature-adjusting door is mounted between the evaporator and the heater core to control temperature by adjusting an amount of mixture that cold air passing the evaporator and warm air passing the heater core are mixed together.

Through the above structure, the inside air or the outside air of the vehicle is selectively introduced by the blower motor and the blower wheel according to opening and closing of the intake door. The introduced air is cooled or heated when it selectively passes the evaporator by being blown to the air-conditioning case or passes the heater core by operation of the temperature-adjusting door. After that, the cooled or heated air is branched to branch ducts according to opening and closing of a plurality of the mode doors 46 by an air-conditioning mode so as to be discharged to each part of the interior of the vehicle, so that the interior of the vehicle is cooled, heated or ventilated.

The air filter 200 includes a main filter part 210 and auxiliary filter parts 220 and 230. The air filter 200 includes a frame made with a rigid material, such as plastic, and a filtering member made with a filterable material, such as non-woven fabric through which air passes. The filterable material of the filtering member has a plurality of peaks by being folded in the form of creases.

The main filter part 210 is in the form of a rectangular plate and covers a blower inlet 191 of a blower case 123 formed above the blower wheel. The main filter part 210 is formed to be bilaterally symmetrical and vertically symmetrical based on the blower inlet 191.

The main filter part 210 is formed to correspond to an air intake area 1256. Referring to FIG. 6, the air introduced through the inside air inlet 121 and the outside air inlet 122 passes the air intake area 1256 of an approximately rectangular cross section, passes the air filter 200, and then is inhaled to the blower inlet 191. The main filter part 210 is formed to correspond to the air intake area 1256 to filter the air passing the main filter part 210.

The auxiliary filter parts 220 and 230 extend in the lateral direction of the main filter part 210. That is, the auxiliary filter parts 220 and 230 is formed in the outside direction of the air intake area 1256. The auxiliary filter parts 220 and 230 may be formed asymmetrically based on the blower inlet 191. Preferably, the auxiliary filter parts 220 and 230 are formed to extend integrally with the main filter part 210. In this instance, the air introduced from the inside air inlet 121 or the outside air inlet 122 is induced into the blower inlet 191 after passing through the main filter part 210 or the auxiliary filter parts 220 and 230.

A suction force acts to the blower inlet 191 by the blower wheel which rotates in a state where it is connected to the blower motor. The air introduced into the blower case 123 through the inside air inlet 121 or the outside air inlet 122 is induced into the blower inlet 191 after passing through the main filter part 210.

In this instance, if the air filter 200 is used for a long period without any exchange, while the air passes the main filter 210, the air filter is deteriorated in filtration performance by dust and suspended particles accumulated on the main filter part 210.

Finally, because the air filter 200 includes the auxiliary filter parts 220 and 230, the air is introduced to the blower inlet 191 after passing through the auxiliary filter parts 220 and 230 formed in the outside direction of the main filter part 210 so that the air filter can maintain filtration performance for a long period so as to increase the exchange cycle of the filter.

The air filter 200 has the structure that the auxiliary filter parts 220 and 230 are extended integrally to the main filter part 210. In this instance, the first auxiliary filter part 230 and the second auxiliary filter part 220 are respectively formed on the neighboring sides of the main filter 210, so that the air filter 200 can have a polygonal shape.

Therefore, the design of the intake unit can be freely changed regardless of kinds and sizes of vehicles, and as described above, the air filter can be increased in size and enhance filtration performance. Additionally, the rectangular filter may be assembled in error in the lateral direction or in the back and forth direction, but the polygonal filter can prevent misassembly when it is mounted.

In more detail, the auxiliary filter parts 220 and 230 are the first auxiliary filter part 230 which extends in the width direction of the intake door and the second auxiliary filter part 220 which extends in the length direction of the intake door. In this instance, the length direction of the intake door extends toward the outside air inlet 122. The auxiliary filter parts 220 and 230 respectively have air flow gaps relative to the blower case. Moreover, cover parts 1259 are respectively disposed above the auxiliary filter parts 220 and 230 in such a way that gaps are formed between the upper faces of the auxiliary filter parts 220 and 230 and the inner faces of the cover parts 1259. The gaps are a first gap G1 and second gaps G2 and G3. The first gap G1 is formed to insert the air filter 200 into the intake case. The second gaps G2 and G3 are formed to promote a flow of the air. The air introduced into the air intake area 1256 through the inside air inlet 121 and the outside air inlet 122 passes through the second gaps G2 and G3, and then, passes through the auxiliary filter parts 220 and 230.

Furthermore, referring to FIGS. 9 and 10, the cover part of the first auxiliary filter part 230 is formed to be stepped in the up and down direction. Preferably, the cover part 1259 is formed in such a way that a distance (gap) between the air filter and the cover part is reduced toward the outside from the main filter part 210. As described above, the stepped form of the cover part reinforces intensity of the case and enhances the flow of the air toward the auxiliary filter parts.

Additionally, the air filter 200 has a crease expansion part 240 formed at one or more parts in order to widen intervals between the peaks of the filtering member. Preferably, the crease expansion part 240 is formed at a boundary part between the main filter part 210 and the auxiliary filter parts 220 and 230.

Referring to FIGS. 8 and 10, the crease expansion part 240 is formed at the boundary part between the main filter part 210 and the auxiliary filter parts 220 and 230. Intervals between creases of the crease expansion part 240 are wider than those between the remaining creases of the filtering member. The crease extension part 240 leads some of the air, which is introduced into the blower inlet 191 after passing the main filter part 210, to pass through the auxiliary filter parts 220 and 230 and to be introduced into the blower inlet 191.

Therefore, the air which will pass through the main filter part 210 is guided to the lateral direction by high pressure applied to the blower inlet 191, and hence, is filtered through the auxiliary filter parts 220 and 230. Finally, the crease expansion part 240 maximize filtration efficiency of the air filter.

In more detail, the auxiliary filter parts 220 and 230 have the crease expansion part 240 formed at a position corresponding to a joining portion of a shaft 1257 of the intake door. Referring to FIG. 4, an area (C) where the first auxiliary filter part 230 is located protrudes further to the outside than the inside air and outside air inlets 121 and 122 of the intake door, and a matching portion 1258 of the shaft of the intake door (shown in FIG. 10) is formed in an approximately fan shape. The joining portion of the shaft of the intake door is downwardly inclined, and a gap between the filter parts at the joining part between the door shaft and the case becomes narrower than that at other parts.

Because the crease expansion part 240 promotes a smooth flow of the air which passes the crease expansion part 240, it prevents that fluidity of the air is deteriorated due to reduction of the gap above the auxiliary filter part 230 by the matching portion 1258 of the shaft of the intake door. In this instance, the crease expansion part 240 may have one or more creases.

Furthermore, the cover part of the second auxiliary filter part 220 includes a rainwater drain groove part 1255. The rainwater drain groove part 1255 is elongated along a boundary surface between the main filter part 210 and the auxiliary filter part 220 in order to induce a smooth discharge of rainwater by receiving rainwater and guiding the received rainwater to the outside.

The gaps between the auxiliary filter parts 220 and 230 and the cover part 1259 are the first gap G1 which is an assembly gap for inserting the air filter 200 into the intake case and the second gap G2 for promoting a flow of the air. The first gap G1 is the assembly gap for inserting the air filter 200 into the intake case. The second gap G2 is to promote a flow of the air. The air introduced into the air intake area 1256 through the inside air inlet 121 and the outside air inlet 122 passes through the second gaps G2 and G3, and then, passes through the auxiliary filter parts 220 and 230.

The blower unit includes guide means for guiding some of the air of the main filter part 210 toward the auxiliary filter parts 220 and 230. The guide means may have a stepped portion formed by a gap between the auxiliary filer parts 220 and 230 and the cover part. The stepped portion is formed in such a way that an interval between the air filter 200 and the cover part is reduced toward the outside.

Figure 11:
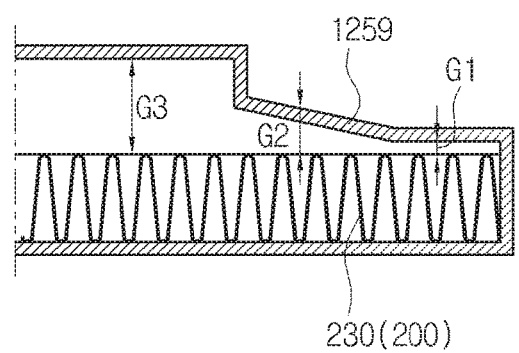
FIG. 11 is a side sectional view showing the air filter of the air conditioner for the vehicle according to the preferred embodiment of the present invention.

FIG. 11 is a side sectional view showing the air filter of the air conditioner for the vehicle according to a modification of FIG. 9. Referring to FIG. 11, the stepped portion has an inclined portion which is downwardly inclined toward the outside in order to guide the flow of the air. In other words, the cover part 1259 formed above the auxiliary filter part 220 and 230 is formed to be stepped toward the outside in such a way that some or the entire of the cover part 1259 is downwardly inclined toward the outside, so that the inclined portion guides the air from the main filter part 210 toward the auxiliary filter parts 220 and 230. That is, the air filter can enhance air fluidity toward the auxiliary filter parts because guides the air from the main filter part 210 toward the auxiliary filter parts 220 and 230 along the inclined portion, reinforce intensity of the case, and smoothly guide moisture outside the case toward the rainwater drain groove part 1255.

In the meantime, the guide means may be the crease expansion part 240 formed in the air filter 200. The crease expansion part 240 is formed at the boundary between the main filter part 210 and the auxiliary filter parts 220 and 230. The crease expansion part 240 is wider in the intervals between the peaks of the filtering member than those of other parts. The crease expansion part 240 serves to induce some of the air, which is introduced into the blower inlet 191 after passing the main filter part 210, to the blower inlet after passing through the auxiliary filter parts 220 and 230. Therefore, the air filter guides the air which will pass through the main filter part 210 toward the lateral direction by high pressure applied to the blower inlet 191 so as to filter the air through the auxiliary filter parts 220 and 230. Finally, the crease expansion part 240 can maximize filtration efficiency of the air filter.

As described above, while the present invention has been particularly shown and described with reference to the example embodiment thereof, it will be understood by those of ordinary skill in the art that the above embodiment of the present invention is exemplified and various changes, modifications and equivalents may be made therein without changing the essential characteristics and scope of the present invention. Therefore, it would be understood that the protective scope of the present invention is defined by the technical idea of the following claims

What is claimed is:

1. A blower unit of an air conditioner for a vehicle which includes a blower case having an inside air inlet for introducing inside air and an outside air inlet for introducing outside air, a blower wheel disposed inside the blower case and rotated by a blower motor, and an air filter disposed at the upstream side of the blower wheel in an air flow direction to filter impurities,
    wherein the air filter includes a main filter part corresponding to an air intake area and auxiliary filter parts which are formed in a laterally outside direction relative to the air intake area;
    wherein the blower case extends laterally outward relative to the air intake area so that it has an area (C) that provides the location of the auxiliary filter parts.

2. The blower unit according to claim 1, wherein the auxiliary filter parts are:
    a first auxiliary filter part which extends in a width direction of an intake door; and
    a second auxiliary filter part which extends in a length direction of the intake door.

3. The blower unit according to claim 2, wherein the auxiliary filter parts have air flow gaps relative to the blower case.

4. The blower unit according to claim 3, wherein the auxiliary filter parts respectively have first and second cover parts formed above the auxiliary filter parts to have predetermined gaps.

5. The blower unit according to claim 1, wherein the auxiliary filter parts have crease expansion parts formed at positions corresponding to joining portions between a shaft of the intake door and an actuator.

6. The blower unit according to claim 4, wherein the first cover part of the first auxiliary filter part is formed to be stepped in a vertical direction.

7. The blower unit according to claim 4, wherein the second cover part of the second auxiliary filter part has a rainwater drain groove part.

8. The blower unit according to claim 2, wherein the length direction of the intake door extends toward the outside air inlet.

9. The blower unit according to claim 4, wherein the gaps between the first and second auxiliary filter parts and the respective first and second cover part include:
    a first gap which is an assembly gap for inserting the air filter into the intake case; and
    a second gap which is a flow gap for promoting a flow of the air.

10. The blower unit according to claim 4, further including:
    guide means for guiding some of the air of the main filter part toward the auxiliary filter parts.

11. The blower unit according to claim 10, wherein the guide means is a stepped portion formed by a gap between the first and second auxiliary filter parts and the respective first and second cover part.

12. The blower unit according to claim 11, wherein the stepped portion is formed such that an interval between the air filter and the first and second cover part becomes reduced toward the outside.

13. The blower unit according to claim 11, wherein the stepped portion has an inclined portion which is downwardly inclined toward the outside in order to guide the flow of the air.

14. The blower unit according to claim 10, wherein the guide means is the crease expansion part formed on the air filter.

15. The blower unit according to claim 14, wherein the crease expansion part is formed at a boundary between the main filter part and at least one of the first and second auxiliary filter parts.

* * * * *